United States Patent
Kim

[11] Patent Number: 5,825,131
[45] Date of Patent: Oct. 20, 1998

[54] TILT COMPENSATION CIRCUIT FOR PICTURE TUBES

[75] Inventor: Eun-sup Kim, Seoul, Rep. of Korea

[73] Assignee: Samsung Electronics Co., Ltd., Rep. of Korea

[21] Appl. No.: 566,950

[22] Filed: Dec. 4, 1995

[30] Foreign Application Priority Data

Dec. 2, 1994 [KR] Rep. of Korea ........................ 94-32619

[51] Int. Cl.$^6$ ........................................................ H04N 9/29
[52] U.S. Cl. ................................ 315/8; 315/370; 361/150
[58] Field of Search ........................... 315/8, 85, 370; 361/150

[56] References Cited

U.S. PATENT DOCUMENTS

| | | | |
|---|---|---|---|
| 4,908,550 | 3/1990 | Chase et al. | 315/8 |
| 5,021,712 | 6/1991 | Sands et al. | 315/8 |
| 5,170,096 | 12/1992 | Kang et al. | 315/8 |
| 5,488,270 | 1/1996 | Takita et al. | 315/8 |
| 5,499,156 | 3/1996 | Bentley | 361/150 |
| 5,508,588 | 4/1996 | Wu | 315/8 |

*Primary Examiner*—Robert Pascal
*Assistant Examiner*—Justin P. Bettendorf
*Attorney, Agent, or Firm*—Banner & Witcoff, Ltd.

[57] ABSTRACT

A tilt compensation circuit for a picture tube is provided to correct an image rotation phenomenon of a currently displayed image on a screen caused by an outer interference such as terrestrial magnetism. In the picture tube, an alternating current for driving the tube is applied to a power supply circuit for voltage conversion through an AC line filter and to a degaussing coil as well. The circuit includes a tilt adjustment circuit for comparing a tilt compensation control signal of a predetermined voltage level with a voltage feedback signal from the degaussing coil thereby generating current corresponding the difference therebetween. The circuit further includes a switching circuit responsive to a state of the tilt compensation control signal for selectively switching between a first circuit loop incorporating the AC line filter and the degaussing coil and a second loop incorporating the tilt adjustment circuit and the degaussing coil. The tilt compensation circuit alternatively performs either an operation of an electromagnetic field elimination or a tilt compensation operation. Accordingly, no additional tilt coil is required to add on existing apparatus but only using a degaussing coil for use with the tilt compensation circuit for a picture tube.

10 Claims, 2 Drawing Sheets

TILT COMPENSATION CIRCUIT FOR PICTURE TUBES

This application makes reference to, incorporates the same herein, and claims all benefits accruing under 35 U.S.C. Section 119 from an application entitled Tilt Compensation Apparatus For Picture Tube earlier filed in the Korean Industrial Property Office on 2 Dec. 1994, which was duly assigned Ser. No.94-32619 by that Office.

BACKGROUND OF THE INVENTION

1. Field of the Invention

The present invention relates to a tilt compensation circuit for a picture tube, and more particularly, to a tilt compensation circuit for use with a picture tube capable of tilt compensation using a degaussing coil which encircles the picture tube for eliminating an electromagnetic field thereof.

2. Description Of Related Art

Generally, a picture tube for displaying images has an electron gun for emitting an electron beam projected onto a screen. The emitted electron beam is deflected horizontally and projected onto the screen. An image is formed according to the density of the projected electron beam. Such a display device as a picture tube is widely used in television receivers or as monitors for a personal computer. A deflection yoke is provided on a picture tube to deflect horizontally and vertically an emitted electron beam from an electron gun.

Since an electron beam is deflected by the electromagnetic field formed by the deflection coil, the deflection angle of the electron beam may be deformed if the electromagnetic field is affected by the outer disturbance. Especially, a terrestrial magnetic field interrupts the track of the electron beam and varies the landing position thereof. As a result, an image rotation is produced as shown in FIG. 1.

A picture tube 6 is fixed to a chassis 4 of a display 2. When deflected normally, an image is displayed so as to be fitted on screen 8. However, when an outer magnetic field affects it, rotated image 8a is displayed in FIG. 1.

Due to this problem, careful consideration must be given during the design of the deflection coil and neck components in order to minimize the effect of the terrestrial magnetic field with respect to the picture tube of the display. For a specific countermeasure, the deflection yoke is rotated manually with respect to the image displayed to compensate for the image rotation caused due to the outer magnetic field. In addition, the picture tube may be shielded. The former method requires experienced technicians. Further, in order to rotate the picture tube, the whole set must be dissembled. The latter method involves a lot of economic burden and large chassis or housing in shielding the picture tube.

In order to overcome such drawbacks, U.S. Pat. No. 5,021,712 to Sands, et al. discloses that a coil is wound in a direction perpendicular to the path of the electron beam emitted from the electron gun, and the electric field generated by currents flowing through this coil performs the image correction. However, the image is affected by the electric field generated from the coil so that focusing is not accurate or the image is deformed.

SUMMARY OF THE INVENTION

In order to overcome such drawbacks, it is an object of the present invention to provide a tilt compensation circuit for a picture tube in which, using a degaussing coil, a tilt compensation operation as well as electromagnetic field elimination is performed in the circuitry configuration.

To accomplish the objects of the present invention, there is provided a tilt compensation circuit for a picture tube in which an alternating current power supply for driving the picture tube is concurrently applied to a power source circuit for voltage conversion through an alternating current AC line filter and to a degaussing circuit for eliminating an electromagnetic field for a predetermined time interval, the circuit comprising: tilt adjustment circuit means for performing a selective switching operation according to a voltage level of a degaussing control signal so as to eliminate an electromagnetic field in a loop incorporating the degaussing coil and the AC line filter circuit or to compensate a tilt in a loop incorporating the degaussing coil and the tilt adjustment circuit means.

The tilt adjustment circuit means may comprise an amplifier for amplifying a difference between a predetermined reference voltage level and the voltage level of a tilt compensation control signal, a comparator for comparing an amplified voltage output from the amplifier with a voltage feedback from the degaussing coil through the switching means to thereby output a current corresponding to the difference therebetween and current amplifying elements for amplifying current output from the comparator and supplying the amplified current to the degaussing coil through the switching means.

In addition, the tilt compensation control signal may be preferably at a voltage level that varies according to the direction and degree of tilt compensation for a currently displayed image. Further, the above switching means may comprise a switching device for switching ON and OFF a reference voltage according to the voltage level of the degaussing control signal and first and second relays for collectively switching a loop including the degaussing coil to selectively incorporate the AC line filter or the tilt compensation circuit means in accordance with a conducting status of the switching device.

Upon completion of the tilt compensation operation by inducing current to the degaussing coil from the tilt adjustment circuit means through switching means, an electromagnetic elimination operation is preferably repeated for a prescribed time period by virtue of the switching of the switching device. Further features and advantages will become more apparent from the following and more particular description of a preferred embodiment of the invention, as illustrated in the accompanying drawings in which like reference characters generally refer to the same parts throughout the views.

DETAILED DESCRIPTION OF PREFERRED EMBODIMENTS

Figure 1:
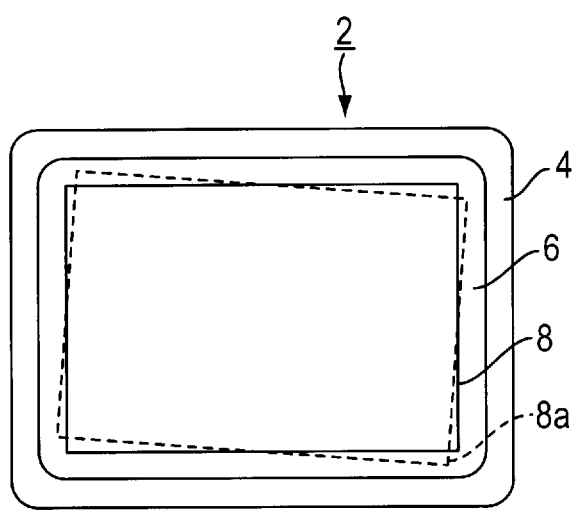
FIG. 1 shows an image rotation phenomenon caused in a picture tube.
Figure 2:
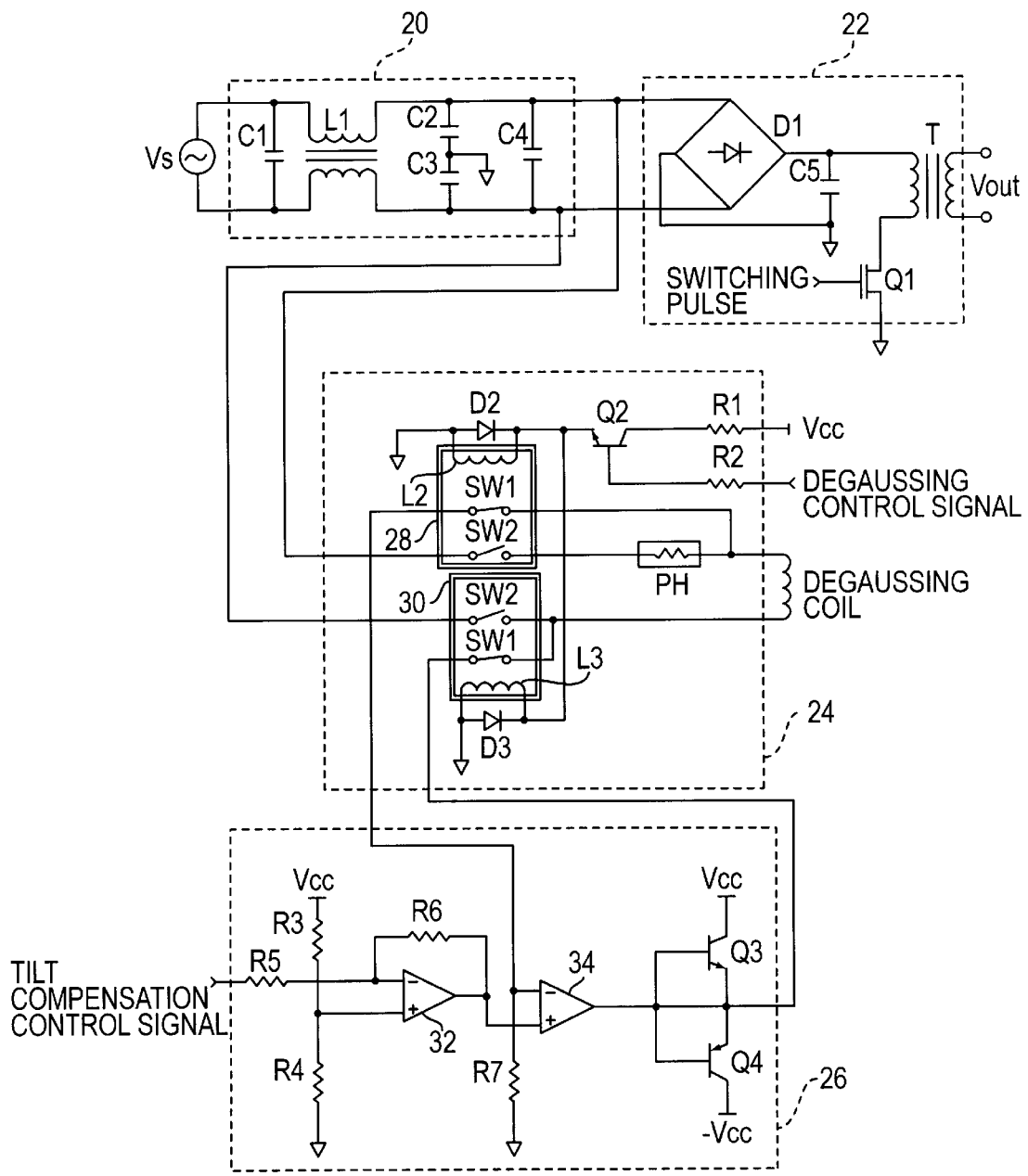
FIG. 2 illustrates a detailed circuit diagram of a preferred embodiment of a tilt compensation circuit for a picture tube according to the principles of the present invention.

Referring to FIG. 2, which illustrates a preferred embodiment of the tilt compensation circuit for a picture tube apparatus of the present invention, the circuit broadly comprises filter circuit 20 coupled to an AC power source Vs, power supply circuit 22 coupled to filter circuit 20 for supplying stable predetermined voltage Vout to various electronic components, switching circuit 24 parallel connected with power supply circuit 22 to filter circuit 20 for selectively supplying a current across a degaussing coil and tilt adjustment circuit 26 coupled to the switching circuit 24 for supplying a tilt compensation current via the switching circuit across the degaussing coil.

Filter circuit 20 comprises capacitor C1 parallel connected with an AC power source, common mode choke inductor L1, line bypass capacitors C2, C3 connected in series and across line capacitor C4. The filter circuit 20, as being an AC line filter, cuts off an influx of noise associated with the AC power supplied from an external source through the AC line and an outflow of noise internally generated as well.

Power supply circuit 22 coupled to filter circuit 20 comprises rectifier D1 for rectifying an current input, voltage smoothing capacitor C5, transistor Q1 for performing switching by a train of pulses from a pulse generator (not shown) and transformer T for inducing the rectified and smoothened voltage across windings to output a voltage output Vout at the terminals of the secondary turns responsive to the switching operation of transistor Q1.

Once the noise-filtered AC power supplied is rectified and smoothened at a voltage level to be applied to a primary winding of transformer T, a current is induced through first windings by the switching operation of transistor Q1 to output a voltage output Vout at both output terminals of second windings thereby supplying voltage output to a variety of electronic components (not shown).

Switching circuit 24 coupled to filter circuit 20 in parallel with power supply circuit 22, comprises transistor Q2 having its collector terminal connected to reference voltage Vcc via resistor R1 and base terminal connected to a terminal via resistor R2 at which terminal a degaussing control signal output from a control source not shown (a signal output from a microprocessor) is provided, a pair of relays 28, 30 collectively switching responsive to the ON/OFF status of transistor Q2 and coupled diodes D2, D3 are parallel connected to respective relays 28, 30 so as to shut off reverse current.

A pair of relays 28, 30 respectively comprises inner coils L2, L3 and switches SW1, SW2 alternately shifting according to induced current across the inner coils. Each of one terminal of switch SW2 in relays 28, 30 is connected to output terminals of filter circuit 20, while the other is connected to both terminals of degaussing coil. Switch SW2 in relay 28 is coupled to a terminal of degaussing coil via posistor (thermosensitive resistor having positive resistance/temperature characteristics) PH.

Each of respective one terminal of switch SW1 in relays 28, 30 is coupled to both terminals of the degaussing coil, while the other terminal is coupled to terminals of tilt adjusting circuit 26. In other words, according to a switching state of both relays 28, 30, in order to degauss a picture tube, filter circuit 20, switch SW2 in relay 28, posistor PH, the degaussing coil and switch SW2 in relay 30 may form a loop, while in order to adjust tilt compensation a loop may be comprised of switch SW1 in relay 30, the degaussing coil, switch SW1 in relay 28 and tilt adjustment circuit 26.

In tilt adjustment circuit 26, reference voltage Vcc is a voltage—divided by serially connected resistors R3 and R4 so as to be applied to a non-inverting (+) terminal of amplifier 32 whereas to an inverting (−) terminal thereof is connected to an input terminal for receiving a tilt compensation control signal via resistor R5, and a resistor R6 defining an output gain is coupled between the inverting (−) terminal and an output terminal thereof.

An amplified output of amplifier 32 is fed to the non-inverting (+) terminal of comparator 34. A feedback voltage from the output terminal of the degaussing coil is applied to a terminal of grounding resistor R7 via switch SW1 in relay 28 comprising a switching circuit.

The terminal of grounding resistor R7 is also connected to the inverting (−) terminal of comparator 34 while the output terminal thereof is coupled to respective base electrode terminals of current amplifier transistors Q3 and Q4. The contact node of the emitter electrode terminal of transistor Q3 and the collector electrode terminal of transistor Q4 are connected to switch SW1 of relay 30 in switching circuit 24. A tilt compensation circuit as constructed heretoabove will now be explained in more detail.

A voltage supplied from AC power source Vs is noise-filtered in filter circuit 20. Filter circuit 20 removes noise voltage associated with normal input voltage and outflow noise internally generated. Noise component on normal AC power source Vs is removed by smoothening and induction through filter circuit 20 comprised of capacitors (C1~C4) and inductor (L1), and the noise-filtered voltage is supplied to power supply circuit 22 and switching circuit 24.

The noise-filtered voltage fed to the power supply circuit is rectified by rectifier D1 and then smoothened across capacitor C5 to thereby be applied to the primary winding input terminals of transformer T. Voltage applied to the input terminals of primary winding of transformer T is induced across second windings responsive to switching operation of transistor Q1 which is activated by a train of switching pulses output from a pulse generator not shown to thereby output a voltage output Vout at its output terminal.

Here, when powered on, a picture tube is initialized by performing a degaussing operation though visually invisible on the screen of the tube. When initialized, as soon as the power supply circuit is supplied with alternating current, an output port (for degaussing control) of a microprocessor, outputs a signal of high state to turn ON transistor Q2 thereby activating a pair of relays 28 and 30.

When relays 28, 30 are activated, both switches SW2 turns on while switches SW1 turns off. General AC power source supplies voltage to the degaussing coil via a pair of switches SW2 so that the degaussing coil is normally excited for a period of approximately five seconds. During this time interval, electromagnetic field elimination operation is performed generating an alternating electromagnetic field as frequently as the frequency of AC supplied. Thereafter, the stabilized power-supply is induced to the second windings of transformer T so as to stabilize whole circuitry.

In addition to the above, a noise-filtered voltage supplied to switching circuit 24 is selectively fed to the degaussing coil depending on the switching operations of a pair of relays 28 and 30. Responsive to a state of degaussing control signal generated from a source not shown, a loop is selectively formed within switching circuitry 24. Depending on the state of a degaussing control signal, ON and OFF state, either one of a loop incorporating filter circuit 20, a pair of relays 28, 30 and the degaussing coil or incorporating tilt adjusting circuit 26, a pair of relays 28, 30 and the degaussing coil is formed as a closed circuit. To explain, when the degaussing control signal is in a low level state, the low state is applied to the base electrode of transistor Q2 via resistor R2, turning it off thereby cut off reference voltage Vcc fed at it's collector electrode so as not to reach both relays 28 and 30.

On the contrary, when in a state of high level, the base electrode of transistor Q2 is fed with a voltage at the high level, turning it on, thereby allowing reference voltage Vcc applied at the collector electrode of transistor Q2 via resistor R1 to be supplied to respective relays 28 and 30.

Relays 28 and 30 are designed so that both switches SW2 turns on when inductors L2, L3 are supplied with current to created magnetic field, while switches SW1 turn off, and vice versa. In addition, reverse voltage and current flow following alteration of polarity the through inductor coil is cut off by a pair of diodes D2, D3.

Both switches SW2 in relays 28, 30 become turned ON when a degaussing control signal of ON state is applied to the base electrode of transistor Q2, allowing current to flow through posistor PH and the degaussing coil thereby an electromagnetic field elimination operation is performed. Such operation lasts a predetermined time interval according to the electrical characteristics of a posistor PH which limits electrical conduction when heat is generated beyond a predetermined level of magnitude by current flow, and then stops as posistor PH breaks. In that instance, the lasting time of electromagnetic field elimination varies depending on the time required, as necessary.

When an image rotation phenomenon occurs, blots appear on currently displayed image, otherwise a tilt compensation is required upon completion of an electromagnetic field elimination operation, a tilt compensation signal of high state output from a microprocessor or any other known generator means is then applied to tilt adjustment circuit 26 in FIG. 2, according to a manipulation of an adjustment device means (not shown) by a user.

In this instance, a degaussing control signal is in a state of low voltage level so that switches SW1 in respective relays 28, 30 turn on thereby forming a loop covering degaussing coil, a pair of relays 28, 30 and tilt adjustment circuit 26. Consequently, when the tilt compensation signal is applied to the inversion terminal (−) of amplifier 32 via resistor R5 in tilt adjustment circuit 26, amplifier 32 refers to an electric potential at non-inversion terminal (+) which is a voltage-divided voltage of reference voltage Vcc by resistors R3, R4 in series connection as a reference electric potential and then amplifies the applied voltage at the inversion terminal (−) in proportion to the ratio of the values of resistors R5 and R6 as an inverted value to thereby output the amplified inverted value to the non-inversion terminal (+) of comparator 34.

Then, comparator 34 compares a voltage level feedback from the degaussing coil with the level of the amplified voltage input from amplifier 32 so as to output current of positive polarity if the level of the input voltage is higher than that of the feedback voltage, otherwise to output current of negative polarity when the level is lower than the feedback voltage level.

Current of positive polarity output from comparator 34 drives current amplifier transistor Q3 so that amplified current is supplied to the degaussing coil through switching circuit 24 thereby creating an electromagnetic field in which flux an electron emitted from an electron gun is deflected in the direction of right from left by Fleming's left hand law to move currently displayed image to the right direction. Otherwise, if of negative polarity, current amplifier Q4 is driven by negative polarity current to supply amplified current to the degaussing coil through switching circuit 24 thereby creating an electromagnetic field forcing currently displayed image to move to the left direction.

Upon completion of such tilt compensation operation as discussed above, the voltage level of a degaussing control signal becomes a low state, which in turn turns off transistor Q2, disabling inductors L2, L3 and then turning on either switches SW1 in relays 28, 30, thereby allowing switches SW2 to turn off.

As a result, an electromagnetic field elimination operation is thus repeated automatically by pre-arrangement of a microprocessor to flow current through the degaussing coil as long of a time interval as posistor permits. After a period of time duration prescribed, posistor becomes non-conductive so that the operation ceases thereby placing currently displayed image into normal state.

Such a repeated degaussing operation as described above according to a signal output automatically from a microprocessor, allows residual magnetism in a picture tube to quickly attenuate exponentially thereby making currently displayed image spotless. As discussed heretofore and shown in FIG. 2, a tilt compensation operation can be performed using a degaussing coil, without adding any hardware onto a picture tube such as, for instance, a tilt coil, and provide currently displayed screen with stainless images by way of elimination of residual magnetism in the tube.

According to the tilt compensation circuit of one preferred embodiment of the present invention, without adding separate tilt coil for compensation image rotation on to a picture tube adjacent to a yoke thereof nor adjustment of a case assembly, both operations of eliminating electromagnetic field and tilt compensation are able to be performed alternatively using an existing degaussing coil, thereby simplifying structural configuration. In addition, by regulating a voltage level of tilt compensation control signal output from a microcomputer, the extent of compensation for image rotation of currently displayed image may well be adjusted precisely in the left or right directions thereby enhancing an efficiency of user manipulation.

From the foregoing detailed description, it will be evident that there are a number of changes, adaptations, and modifications of the present invention which come within the province of those skilled in the art. However, it is intended that all such variations not departing from the spirit of the invention be considered as within the scope thereof as limited solely by the claims appended hereto.

What is claimed is:

1. In a picture tube apparatus for displaying an image in which alternating current for driving a picture tube is supplied through an AC line filter to a power supply circuit for voltage conversion, the AC line filter providing a filtered voltage, a degaussing coil for eliminating an electromagnetic field being coupled to the filtered voltage during a predetermined time interval, a tilt compensation circuit for compensating said image, said image having been tilted in a predetermined direction, said tilt compensation circuit comprising:

tilt adjustment circuit means for comparing a voltage level of a feedback signal from said degaussing coil with a predetermined voltage level of a tilt compensation control signal thereby generating a current flow corresponding to a difference therebetween; and switching circuit means responsive to an electric potential state of a degaussing control signal for selectively switching between one loop incorporating said AC line filter and said degaussing coil so as to perform an electromagnetic field elimination operation and another loop incorporating said tilt adjustment circuit means and said degaussing coil so as to perform a tilt compensation operation.

2. The tilt compensation circuit as claimed in claim 1, wherein said tilt adjustment circuit means comprises:

amplifier means for comparing and amplifying a difference between said tilt compensation control signal and a predetermined voltage level of a reference signal;

comparator means for comparing said amplified voltage level output from said amplifier means with the voltage level of the feedback signal from said degaussing coil as coupled through said switching circuit means to thereby generate the current flow corresponding to the difference therebetween; and a current amplifier device for amplifying said current flow output from said comparator to supply an amplified current to said degaussing coil through said switching circuit means.

3. The tilt compensation circuit as claimed in claim 1, wherein said predetermined voltage level of said tilt compensation control signal varies according to said predetermined direction and a degree of tilt compensation required for a currently displayed image.

4. The tilt compensation circuit as claimed in claim 1, wherein said switching circuit means includes:

a switching device for switching operation responsive to a state of voltage level of said degaussing control signal; and first and second relays responsive to a state of said switching device for selectively switching between said one loop incorporating said degaussing coil and said AC line filter and said another loop incorporating said degaussing coil and said tilt adjustment circuit means.

5. The tilt compensation circuit as claimed in claim 1, wherein a tilt compensation operation is performed by a current applied to said degaussing coil from said tilt adjustment circuit means through said switching circuit means and then an electromagnetic field elimination operation is further performed responsive to switching operation of said switching means during the predetermined time interval.

6. In a picture tube apparatus having an AC line filter providing a filtered voltage and a degaussing coil for eliminating an electromagnetic field, a tilt compensation circuit comprising:

a tilt adjustment circuit having an adjustment signal output for comparing a voltage level of a feedback signal from said degaussing coil with a voltage level of a tilt compensation control signal; and a switching circuit to selectively couple said degaussing coil to one of said AC line filter and said tilt adjustment circuit according to a degaussing control signal, a first circuit loop being formed incorporating said AC line filter and said degaussing coil so as to perform an electromagnetic field elimination operation when said degaussing control signal is characterized by a first voltage, a second circuit loop being formed incorporating said tilt adjustment circuit and said degaussing coil so as to perform a tilt compensation operation when said degaussing control signal is characterized by a second voltage.

7. The tilt compensation circuit as claimed in claim 6, wherein said tilt adjustment circuit comprises:

an amplifier for comparing said tilt compensation control signal and a predetermined voltage level of a reference signal and for amplifying a difference therebetween to generate an amplified signal;

a comparator for comparing said amplified signal and the voltage level of the feedback signal from said degaussing coil as coupled through said switching circuit to generate a compared signal; and means for amplifying said compared signal to generate an adjustment signal at said adjustment signal output.

8. The tilt compensation circuit as claimed in claim 6, wherein said predetermined voltage level of said tilt compensation control signal corresponds to a direction and a degree of tilt compensation required for a currently displayed image.

9. The tilt compensation circuit as claimed in claim 6, wherein said switching circuit includes:

a switching device responsive to a voltage level of said degaussing control signal for switching between first and second conduction states; and first and second relays, each relay responsive to a conduction state of said switching device for selectively coupling said first circuit loop when in the first conduction state and said second circuit loop when in the second conduction state.

10. The tilt compensation circuit as claimed in claim 6, wherein a tilt compensation operation is performed when a current is coupled to said degaussing coil from said adjustment signal output through said switching circuit, an electromagnetic field elimination operation being performed when a current is coupled to said degaussing coil from said AC line filter through said switching circuit.

* * * * *